(12) United States Patent
Scala et al.

(10) Patent No.: US 12,005,961 B2
(45) Date of Patent: Jun. 11, 2024

(54) REAR FASCIA MOUNTING BRACKET

(71) Applicant: Ford Global Technologies, LLC, Dearborn, MI (US)

(72) Inventors: Rebecca Scala, Woodhaven, MI (US); Santiago Muleiro, Mexico City (MX); Luis Becerril, Tultitlan (MX); Victor Hugo Colin Colin, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 130 days.

(21) Appl. No.: 17/666,670

(22) Filed: Feb. 8, 2022

(65) Prior Publication Data

US 2022/0161716 A1 May 26, 2022

Related U.S. Application Data

(63) Continuation of application No. 17/023,951, filed on Sep. 17, 2020, now Pat. No. 11,299,089.

(51) Int. Cl.
*B60Q 1/26* (2006.01)
*B62D 25/08* (2006.01)

(52) U.S. Cl.
CPC ........... *B62D 25/08* (2013.01); *B60Q 1/2623* (2013.01)

(58) Field of Classification Search
CPC ................................ B60Q 1/30; B60Q 1/2623
See application file for complete search history.

(56) References Cited

U.S. PATENT DOCUMENTS

| | | | | |
|---|---|---|---|---|
| 4,532,578 A | * | 7/1985 | Gaden | B60Q 1/2607 362/544 |
| 4,796,165 A | * | 1/1989 | Metti | B60Q 1/2607 362/455 |
| 4,994,942 A | * | 2/1991 | Georgeff | B60Q 1/2607 362/549 |
| 5,154,505 A | | 10/1992 | Sasamoto | |
| 6,520,669 B1 | | 2/2003 | Chen et al. | |
| 8,505,995 B2 | | 8/2013 | Meyers et al. | |
| 9,260,055 B2 | | 2/2016 | McDermott | |
| 9,671,069 B2 | | 6/2017 | Lee et al. | |
| 2003/0147253 A1 | | 8/2003 | Shy | |

FOREIGN PATENT DOCUMENTS

| | | |
|---|---|---|
| JP | 2009101726 A | 5/2009 |
| JP | 2014065370 A | 4/2014 |
| KR | 19980030543 U | 8/1998 |
| KR | 19980030628 U | 8/1998 |

\* cited by examiner

*Primary Examiner* — Julie A Bannan
(74) *Attorney, Agent, or Firm* — Vichit Chea; Carlson, Gaskey & Olds, P.C.

(57) ABSTRACT

A method and an apparatus, according to an exemplary aspect of the present disclosure includes, among other things, a single bracket that has a first portion that attaches a rear fascia to a vehicle body-side sheet metal and a second portion that attaches the rear fascia to a rear panel sheet metal that extends underneath a tail lamp to support the tail lamp.

16 Claims, 4 Drawing Sheets

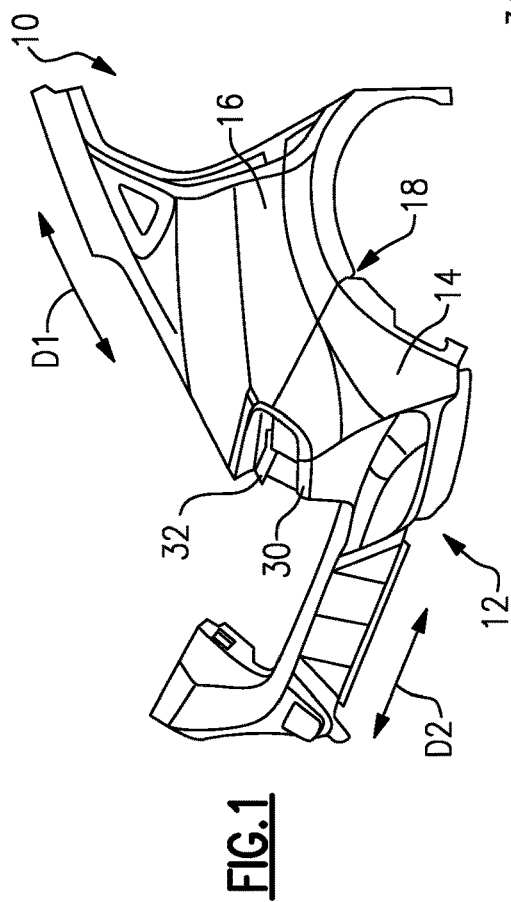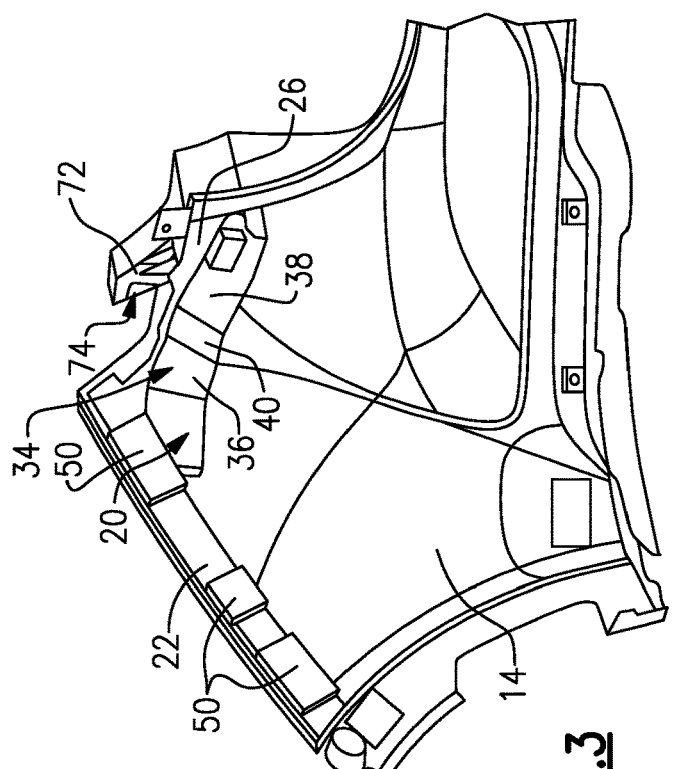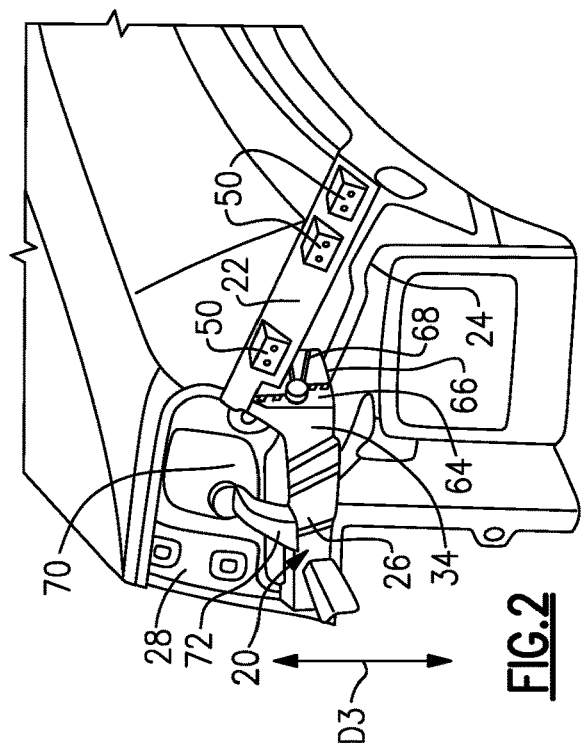

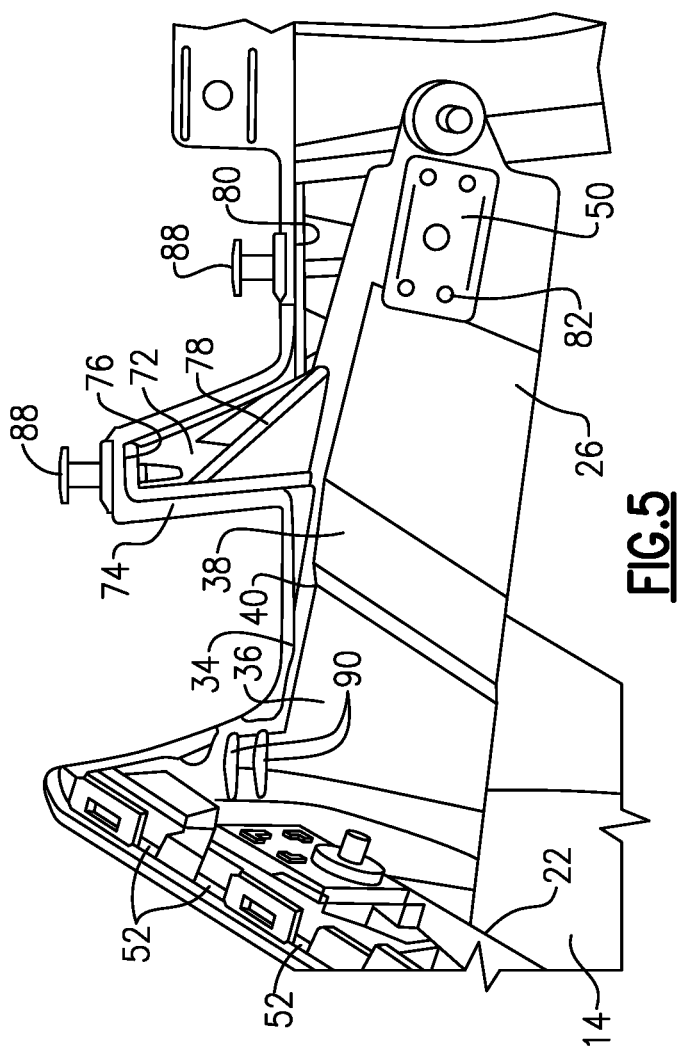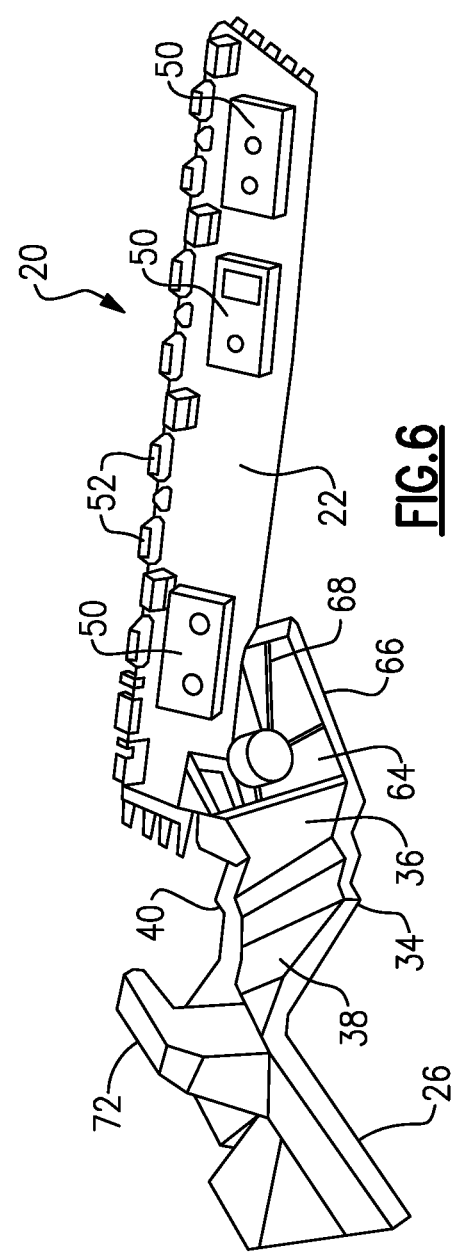

REAR FASCIA MOUNTING BRACKET

RELATED APPLICATIONS

This application is a continuation of prior U.S. application Ser. No. 17/023,951, filed Sep. 17, 2020, the entirety of which is herein incorporated by reference.

TECHNICAL FIELD

This disclosure relates generally to a bracket that attaches a rear fascia to a vehicle body-side sheet metal and to a rear panel sheet metal to support a tail lamp.

BACKGROUND

Multiple brackets are used to attach a rear fascia system to a vehicle body-side sheet metal as well as to a rear panel sheet metal. This requires individual tooling for each bracket and a plurality of installation steps for each bracket on an assembly line. Additionally, brackets should provide desired margin and flushness between adjacent components.

SUMMARY

An apparatus according to an exemplary aspect of the present disclosure includes, among other things, single bracket that has a first portion that attaches a rear fascia to a vehicle body-side sheet metal and a second portion that attaches the rear fascia to a rear panel sheet metal that extends underneath a tail lamp to support the tail lamp.

In a further non-limiting embodiment of the foregoing apparatus, the single bracket includes a flexible portion that connects the first and second portions together.

In a further non-limiting embodiment of any of the foregoing apparatus, the first portion comprises an elongated body portion that extends in a longitudinal direction along a side of a vehicle.

In a further non-limiting embodiment of any of the foregoing apparatus, the second portion comprises an enlarged body portion that extends in a lateral direction underneath the tail lamp along a rear of the vehicle.

In a further non-limiting embodiment of any of the foregoing apparatus, the first portion comprises an elongated body portion that extends in a longitudinal direction along a side of a vehicle and wherein the second portion comprises an enlarged body portion that extends in a lateral direction underneath the tail lamp along a rear of the vehicle.

In a further non-limiting embodiment of any of the foregoing apparatus, a flexible portion connects the first and second portions together to transition between the longitudinal and lateral directions.

In a further non-limiting embodiment of any of the foregoing apparatus, the flexible portion extends in the lateral direction underneath the tail lamp, and the bracket includes a transition bracket portion that extends along the side of the vehicle from the first portion and transitions into the flexible portion.

In a further non-limiting embodiment of any of the foregoing apparatus, the flexible portion comprises a first member and a second member that are connected to each other via a shoulder.

In a further non-limiting embodiment of any of the foregoing apparatus, the first and second members are offset from each other.

In a further non-limiting embodiment of any of the foregoing apparatus, the second portion includes an upwardly extending arm that provides a tail lamp support surface.

An apparatus, according to yet another exemplary aspect of the present disclosure includes, among other things, a rear fascia assembly, at least one tail lamp associated with the rear fascia assembly, and a single bracket that includes a first portion that attaches the rear fascia assembly to a vehicle body-side sheet metal and a second portion that attaches the rear fascia assembly to a rear panel sheet metal to support the at least one tail lamp.

In a further non-limiting embodiment of any of the foregoing apparatus, the first portion comprises an elongated body portion that extends in a longitudinal length direction along a side of a vehicle and the second portion comprises an enlarged body portion that extends in a lateral width direction underneath the tail lamp along a rear of the vehicle.

In a further non-limiting embodiment of any of the foregoing apparatus, the single bracket includes a flexible portion that connects the first and second portions together to transition between the longitudinal and lateral directions.

In a further non-limiting embodiment of any of the foregoing apparatus, the flexible portion extends in the lateral direction underneath the tail lamp, and the bracket includes a transition bracket portion that extends along the side of the vehicle from the first portion and transitions into the flexible portion.

In a further non-limiting embodiment of any of the foregoing apparatus, the flexible portion comprises a first member and a second member that are connected to each other via a shoulder.

In a further non-limiting embodiment of any of the foregoing apparatus, the second portion includes an upwardly extending arm that provides a tail lamp support surface.

A method according to still another exemplary aspect of the present disclosure includes, among other things, attaching a rear fascia to a vehicle body-side sheet metal with a first portion of a single bracket, and attaching the rear fascia to a rear panel sheet metal with a second portion of the single bracket, wherein the rear panel sheet metal extends underneath a tail lamp to support the tail lamp.

In a further non-limiting embodiment of the foregoing method, the first portion comprises an elongated body portion that extends in a longitudinal length direction along a side of a vehicle and wherein the second portion comprises an enlarged body portion that extends in a lateral width direction underneath the tail lamp along a rear of the vehicle, and including connecting the first and second portions together with a flexible portion.

In a further non-limiting embodiment of any of the foregoing methods, the method includes forming the flexible portion to have a first member and a second member that is offset from the first member and is connected to the first member via a shoulder.

In a further non-limiting embodiment of any of the foregoing methods, the method includes forming the second portion to include an upwardly extending arm that provides a tail lamp support surface.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 is a perspective view of a rear fascia assembly attached to a vehicle.

FIG. 2 is a perspective view of a single bracket that is attached to a vehicle body-side sheet metal and to a rear panel sheet metal.

FIG. 3 is a perspective view of the single bracket of FIG. 2 attached to an inner surface of the rear fascia assembly.

FIG. 5 is an interior view of the single bracket installed at a tail lamp location.

FIG. 6 is a perspective view of an opposite side of the single bracket of FIG. 4.

DETAILED DESCRIPTION

Figure 4:
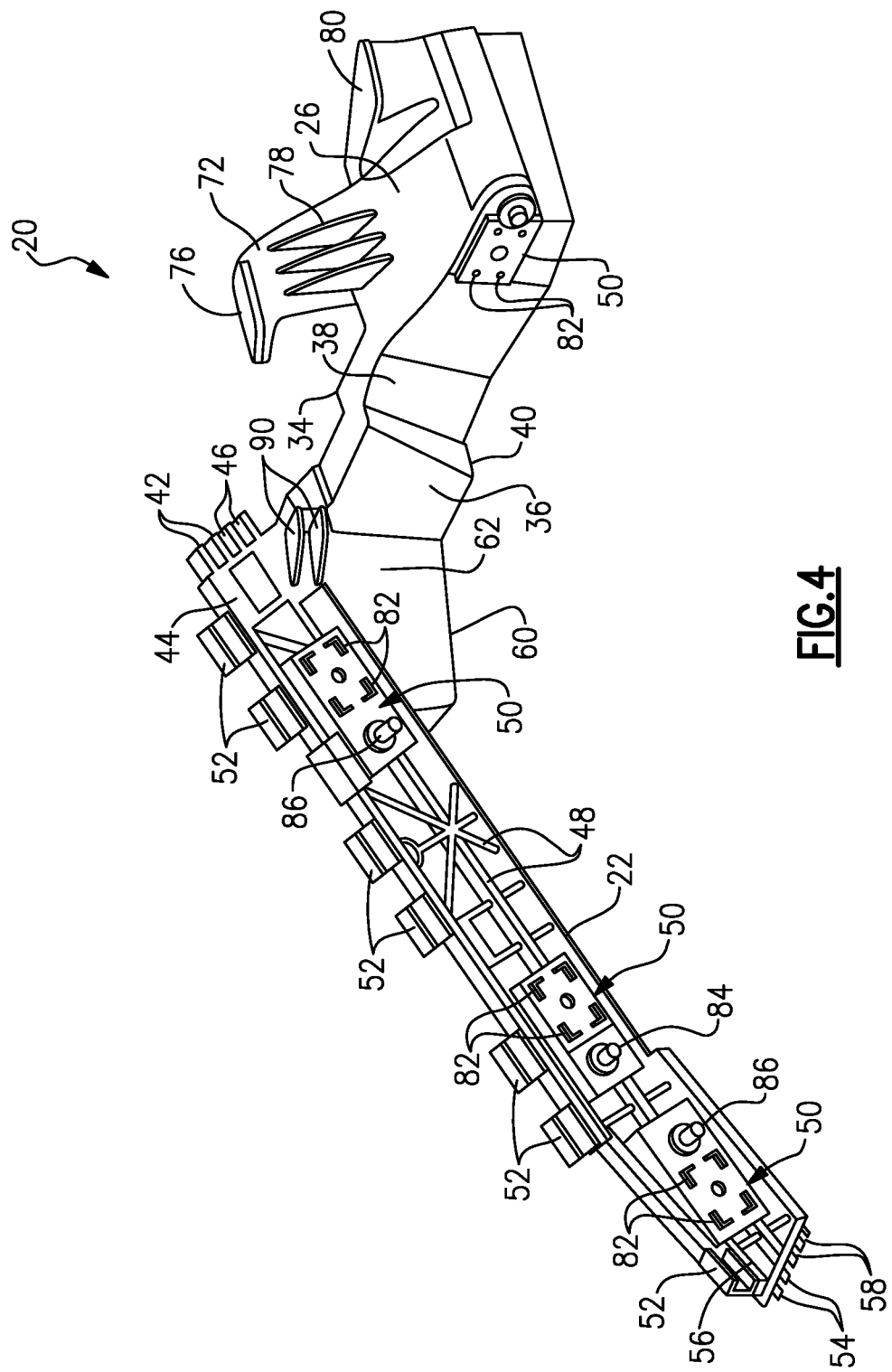
FIG. 4 is a perspective view of the single bracket of FIG. 3.

This disclosure details an exemplary bracket that attaches a rear fascia assembly to a vehicle body-side sheet metal as well as to a rear panel sheet metal to support a tail lamp.

With reference to FIG. 1, a vehicle 10 includes a rear fascia system or assembly 12 having a rear fascia panel 14 that is positioned adjacent to a side panel 16 to provide a flush interface 18 between the two panels 14, 16. As shown in FIGS. 2-3, a single bracket 20 includes a first portion 22 that attaches the rear fascia panel 14 to a vehicle body-side sheet metal 24 and a second portion 26 that attaches the rear fascia panel 14 to a rear panel sheet metal 28. The fascia panel 14 includes a portion 30 that extends at least partially around a tail lamp 32 (FIG. 1). The rear panel sheet metal 28 extends underneath the tail lamp 32 to provide support for the tail lamp 32. The second portion 26 of the bracket 20, which attaches to the rear panel sheet metal 28, also extends underneath the tail lamp 32 to provide support for the tail lamp 32

In one example, the first portion 22 of the bracket 20 comprises an elongated body that extends in a longitudinal direction D1 along a side of the vehicle 10 and the second portion 26 comprises an enlarged body that extends in a lateral direction D2 underneath the tail lamp 32 along a rear of the vehicle 10. In one example, the first portion 22 has a greater overall length than the second portion 26. In one example, there is a vertical offset between the first 22 and second 26 portions in a vertical direction D3 along a height of the vehicle 10 as best shown in FIG. 2. This accommodates transition areas from the side of the vehicle 10 to a rear of a vehicle 10 around the tail lamp 32.

Figure 7:
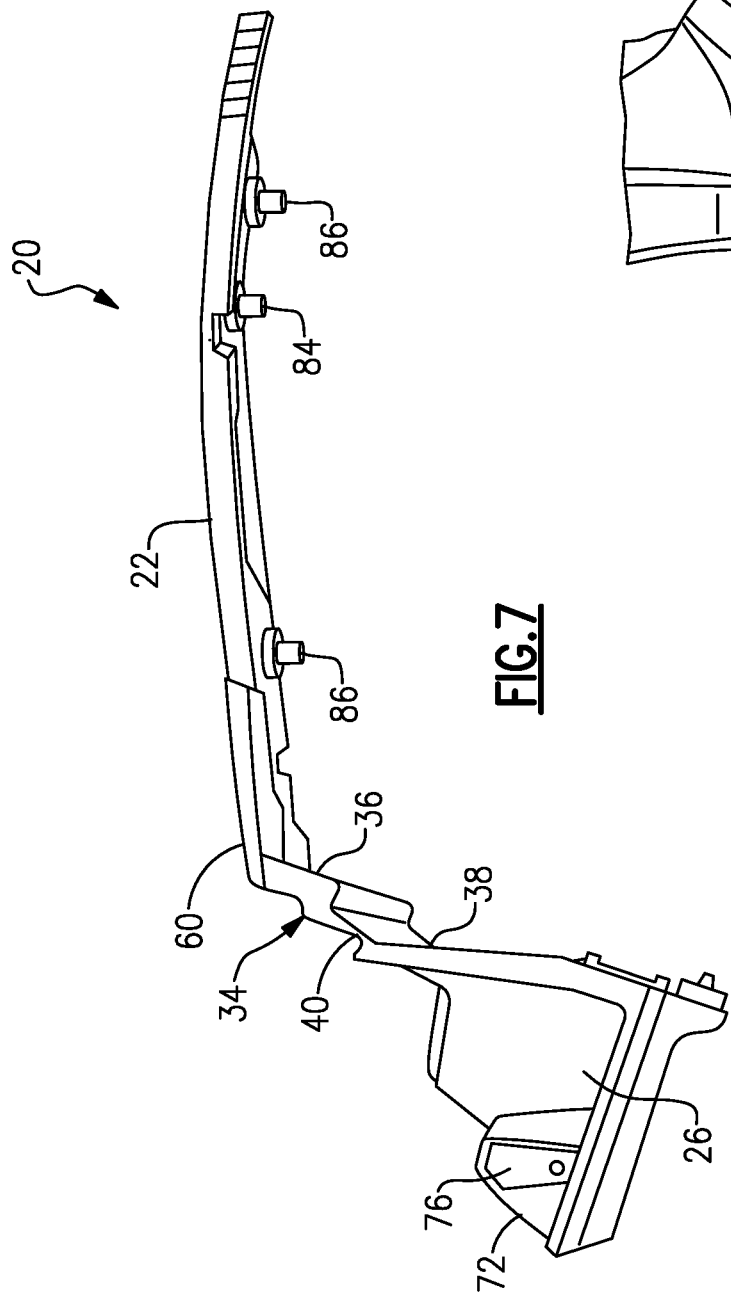
FIG. 7 shows a top end view of the single bracket of FIG. 4

A flexible portion 34 connects the first 22 and second 26 portions together to transition between the longitudinal D1 and lateral D2 directions. In one example, the flexible portion 34 comprises a first member 36 and a second member 38 that are connected to each other via a shoulder 40 as shown in FIG. 4. The first 36 and second 38 members are offset from each other in the longitudinal direction D1. The shoulder 40 provides a flexible, pivoting portion 34 (see FIG. 7) that allows the bracket portions 22, 26 to move relative to each other to accommodate for dimensional variations.

In one example, the first portion 22 of the bracket 20 includes a plurality of ribs 42 that extend outwardly from one distal end 44 of the first elongated body. The ribs 42 are spaced apart from each other by open gaps 46 such that the distal ends of the ribs 42 are not connected to each other. The ribs 42 control flush and margin from the fascia panel 14 to the tail lamp 32. This allows the fascia panel 14 to maintain a consistent gap of a desired size between the fascia panel 14 and the tail lamp 32 as well as reducing any offset between the fascia panel 14 and tail lamp 32 to maintain flushness.

In one example, the first portion 22 includes additional ribs 48 on an inwardly facing surface of the first portion 22. These ribs 48 provide additional strength and rigidity to the bracket 20. The first portion 22 may also be formed include pockets or recessed areas 50 (FIG. 2) that can provide mounting interfaces for attachment to the rear fascia panel 14. These areas protrude from the inwardly facing surface of the first portion 22 as shown in FIG. 4 and are recessed on an outwardly facing surface of the first portion 22 as shown in FIGS. 2 and 6. The second portion 26 of the bracket 20 can also include one or more pockets 50 as shown in FIG. 4. Each attachment pocket 50 also has tuning rib features 82 that allow for margin control against adjacent components such as the sheet metal and tail lamp.

The bracket 20 includes a hands-free feature that allows for the bracket 20 to stay in place on the sheet metal while an operator is installing fasteners. This further increases the ease of installation and reduces the operation time. In one example, the hands-free feature comprises a clip 84 (FIG. 4) that fits into the sheet metal to hold the bracket 20 in place. Additionally, the bracket 20 has locating features 86 that help align and position the bracket 20 when it is being installed. This also helps on the ease of installation, as well as positioning and margin and flushness control.

In one example, the first portion 22 also includes plurality of tabs and/or clips 52 that extend at least along one side of the elongated body of the first portion 22. These clips 52 facilitate attachment of the rear fascia panel and/or vehicle body-side sheet metal 24 to the bracket 20. Additional ribs 54 are formed on an opposite end 56 of the first portion 22 from the ribs 42. The ribs 54 are spaced apart from each other by open gaps 58 such that the distal ends of the ribs 54 are not connected to each other. The clips 52 and ribs 54 control flushness and margin from the fascia panel 14 to the body side panel 16. This allows the fascia panel 14 to maintain a consistent gap of a desired size between the fascia panel 14 and the body side panel 16 as well as reducing any offset between the fascia panel 14 and body side panel 16 to maintain flushness.

In one example, as shown in FIG. 4, an enlarged central or transition bracket portion 60 extends from the first portion 22 to the flexible portion 34. This transition bracket portion 60 comprises a solid plate portion that in one exemplary configuration has a smooth, flat, or non-textured inwardly facing surface 62 (FIGS. 3-4) that fits against the vehicle body-side sheet metal 24 and an exterior facing surface 64 (FIG. 2). A flange or rim 66 extends outwardly toward the rear fascia panel 14 at least partially around the exterior facing surface 64 to form a recessed area. A plurality of ribs 68 extend outwardly of the exterior facing surface 64 to increase strength and rigidity of the bracket 20. In one example, the ribs 68 are circumferentially spaced apart from each other and extend radially outwardly from an inner ring rib to the rim 66. The central bracket portion 60 transitions to the first member 36 of the flexible portion 34 as best shown in FIG. 4.

Figure 8:
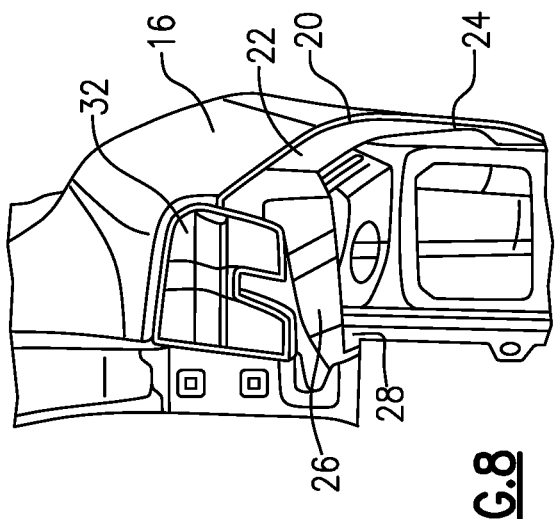
FIG. 8 shows a tail lamp installed with the single bracket.

In one example, the flexible portion 34 extends along the rear of the vehicle 10 and underneath a tail lamp area 70 as shown in FIG. 2. The second member 38 of the flexible portion 34 transitions to the second portion 26 of the bracket 20 and provides support for the tail lamp 32. In one example, the second portion 26 includes an upwardly extending arm 72 that provides a tail lamp support surface. The arm 72 fits within a recessed area 74 of the rear fascia panel 14, as shown in FIGS. 3 and 5, and extends up toward the tail lamp area 70. In one example, the arm 72 extends from the second portion 26 of the bracket 20 to a flat distal end face 76 and includes ribs 78 that extend outwardly of the arm 72 to further increase strength and rigidity. A distal end of the second portion 26 includes a flat base area 80 to provide further support for the tail lamp 32. The flat distal end face 76 and the flat base area 80 provide two attachment points for utilizing fasteners 88 on the tail lamp flat support zones that help securing the fascia in its correct position as shown in FIG. 5. FIG. 8 shows the tail lamp 32 installed relative to the side panel 16 and the bracket 20. Additional ribs 90 can be used to increase strength and rigidity at the transition between the first portion 22 and the flexible portion 34 (FIGS. 4-5).

The bracket 20 includes clips 52 and other openings that are configured to receive fasteners (not shown). The clips and fasteners secure the bracket 20 to the sheet metal 24, 28 and/or fascia panel 14. The clips and fastener openings can be formed in the bracket 20 in various different configurations as needed.

The subject disclosure provides a simple low-cost, one-piece body side/tail lamp bracket 20. The bracket 20 has a flex function to accommodate variations as the bracket transitions from the side of the vehicle to the rear of the vehicle. This bracket 20 promotes an easier installation and assembly of the rear fascia 12 to the body. This simpler design reduces the number of parts and has less variation on the margin and flushness of the tail lamp to the rear fascia and of the fascia to the body side panel. In one example configuration, there was a margin improvement between rear fascia and bodyside of about 60% for a left hand side of the vehicle, and of about 50% for a right hand side, as compared to multi-bracket configurations. Further, as the number of parts has been reduced, at least one less tooling mold is required, associated fasteners are eliminated, and assembly time is reduced which provides for a cost reduction in tooling and materials.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
a single bracket including a first portion configured to attach a rear fascia to a vehicle body-side sheet metal and a second portion configured to attach the rear fascia to a rear panel sheet metal that extends underneath a tail lamp, and wherein the single bracket includes a flexible portion with opposing end portions that connect the first and second portions together, and wherein the flexible portion extends in a lateral direction by the tail lamp along a rear of a vehicle, and wherein the flexible portion comprises a first member and a second member that are connected to each other via a shoulder, and wherein the first and second members are offset from each other.

2. The apparatus of claim 1, wherein the single bracket includes a vertical offset between the first and second portions in a vertical direction along a height of a vehicle.

3. An apparatus, comprising:
a single bracket including a first portion configured to attach a rear fascia to a vehicle body-side sheet metal and a second portion configured to attach the rear fascia to a rear panel sheet metal that extends underneath a tail lamp, and wherein the single bracket includes a flexible portion that connects the first and second portions together, and wherein the flexible portion extends in a lateral direction by the tail lamp along a rear of a vehicle, and wherein the flexible portion comprises a first member associated with the first portion of the single bracket and a second member associated with the second portion of the single bracket, and wherein the first and second members are offset from each other.

4. The apparatus of claim 1, wherein the first portion comprises an elongated body portion that extends in a longitudinal direction along a side of a vehicle.

5. The apparatus of claim 1, wherein the rear panel sheet metal is configured to support the tail lamp, and wherein the second portion comprises an enlarged body portion that extends in the lateral direction underneath the tail lamp along the rear of the vehicle to provide additional support for the tail lamp.

6. The apparatus of claim 1, wherein the first portion comprises an elongated body portion that extends in a longitudinal direction along a side of a vehicle and wherein the second portion comprises an enlarged body portion that extends in the lateral direction underneath the tail lamp along the rear of the vehicle, and wherein the flexible portion extends underneath the tail lamp and connects the first and second portions together to transition between the longitudinal and lateral directions.

7. An apparatus, comprising:
a single bracket including a first portion configured to attach a rear fascia to a vehicle body-side sheet metal and a second portion configured to attach the rear fascia to a rear panel sheet metal that extends underneath a tail lamp, and wherein the single bracket includes a flexible portion that connects the first and second portions together, and wherein the flexible portion extends in a lateral direction by the tail lamp along a rear of a vehicle, and wherein the single bracket includes a transition bracket portion that extends along a side of the vehicle from the first portion and transitions into the flexible portion.

8. The apparatus of claim 1, wherein the second portion includes an upwardly extending arm that provides a tail lamp support surface.

9. An apparatus, comprising:
a rear fascia assembly;
at least one tail lamp associated with the rear fascia assembly; and
a single bracket that includes a first portion that attaches the rear fascia assembly to a vehicle body-side sheet metal, a second portion that attaches the rear fascia assembly to a rear panel sheet metal to support the at least one tail lamp, and a flexible portion that connects the first and second portions together, and wherein the flexible portion extends in a lateral width direction underneath a tail lamp location for the at least one tail lamp along a rear of a vehicle, and wherein the single bracket includes a transition bracket portion that extends along a side of the vehicle from the first portion and transitions into the flexible portion.

10. The apparatus of claim 9, wherein the first portion comprises an elongated body portion that extends in a longitudinal length direction along a side of a vehicle and wherein the second portion comprises an enlarged body portion that extends in the lateral width direction underneath the tail lamp along the rear of the vehicle, and wherein the flexible portion connects the first and second portions together to transition between the longitudinal and lateral directions.

11. The apparatus of claim 9, wherein the flexible portion comprises a first member and a second member that are connected to each other via a shoulder.

12. The apparatus of claim 9, wherein the second portion includes an upwardly extending arm that provides a tail lamp support surface.

13. The apparatus of claim 9, wherein the single bracket includes a vertical offset between the first and second portions in a vertical direction along a height of a vehicle, and/or wherein the flexible portion comprises a first member associated with the first portion of the single bracket and a second member associated with the second portion of the single bracket, and wherein the first and second members are offset from each other.

14. A method comprising:

attaching a rear fascia to a vehicle body-side sheet metal with a first portion of a single bracket;

attaching the rear fascia to a rear panel sheet metal with a second portion of the single bracket, wherein the rear panel sheet metal extends underneath a tail lamp to support the tail lamp; and connecting the first and second portions together with a flexible portion of the single bracket, wherein the flexible portion extends in a lateral direction underneath a tail lamp location of the tail lamp along a rear of a vehicle, and including forming the flexible portion to have a first member and a second member that is offset from the first member and is connected to the first member via a shoulder.

15. The method of claim 14, wherein the first portion comprises an elongated body portion that extends in a longitudinal length direction along a side of a vehicle and wherein the second portion comprises an enlarged body portion that extends in the lateral direction underneath the tail lamp along the rear of the vehicle.

16. The method of claim 14, including forming the second portion to include an upwardly extending arm that provides a tail lamp support surface.

* * * * *